(12) United States Patent
Kemper

(10) Patent No.: US 8,037,544 B2
(45) Date of Patent: Oct. 18, 2011

(54) SELF-SECURING GARMENT

(75) Inventor: Alicia Kemper, Gainesville, FL (US)

(73) Assignee: Covies, Inc., Gainesville, FL (US)

(*) Notice: Subject to any disclaimer, the term of this patent is extended or adjusted under 35 U.S.C. 154(b) by 353 days.

(21) Appl. No.: 12/211,550

(22) Filed: Sep. 16, 2008

(65) Prior Publication Data

US 2010/0064414 A1 Mar. 18, 2010

(51) Int. Cl.
*A41D 13/12* (2006.01)

(52) U.S. Cl. .................................. 2/51; 2/52

(58) Field of Classification Search ............ 2/51, 114, 2/52, 48, 338, 79, 93, 85, 243.1, 456, 457, 2/46, 47, 49.1, 49.3, 50, 69, 76, 83, 87, 99, 2/101, 120, 117, 221, 237, 309, 311, 339, 2/60, 129, 232, 255, 257, 259, 264; 63/5.1, 63/5.2, 6, 11

See application file for complete search history.

(56) References Cited

U.S. PATENT DOCUMENTS

| | | | | |
|---|---|---|---|---|
| 353,575 A * | 11/1886 | Morrison | ............ | 2/312 |
| 383,847 A * | 6/1888 | Baker | ............ | 24/9 |
| 446,819 A * | 2/1891 | Ostergren et al. | ............ | 24/72.1 |
| 503,683 A * | 8/1893 | Robertson | ............ | 24/72.1 |
| 788,489 A * | 4/1905 | Moore | ............ | 2/51 |
| 796,695 A * | 8/1905 | Blake | ............ | 2/52 |
| 1,243,462 A * | 10/1917 | Troiano | ............ | 2/50 |
| 1,628,433 A * | 5/1927 | Schilke | ............ | 2/52 |
| 1,643,311 A * | 9/1927 | Mercola | ............ | 2/52 |
| 2,080,107 A * | 5/1937 | Brandstein | ............ | 2/50 |
| 2,421,195 A * | 5/1947 | Goldsmith | ............ | 2/48 |
| 2,525,115 A * | 10/1950 | Britton | ............ | 2/49.2 |
| 2,655,659 A * | 10/1953 | Swearingen | ............ | 2/52 |
| 2,675,551 A | 4/1954 | Ser Vaas | | |
| 2,709,812 A * | 6/1955 | Kanzow | ............ | 2/52 |
| 3,136,139 A * | 6/1964 | Sinner | ............ | 63/5.1 |
| 3,908,875 A * | 9/1975 | Wilson et al. | ............ | 224/254 |

(Continued)

FOREIGN PATENT DOCUMENTS

GB 1312683 4/1973

(Continued)

OTHER PUBLICATIONS http://www.healthcareapparel.com/shop/isolation-gowns.html.

(Continued)

*Primary Examiner* — Amy Vanatta
(74) *Attorney, Agent, or Firm* — Saliwanchik, Lloyd & Eisenschenk

(57) ABSTRACT

The application is directed to self-securing garments designed to be donned quickly and safely secured to the body in a matter of seconds. Described are garments having an opening in the back terminating at two opposite edges. Attached to the outside of the garment is at least one flexible elongated band at least partially comprised of a shape-memory material. The ends of the band are formed into dual, oppositely wound coils. To use, the wearer puts on the garment as usual and, grasping a flexible coil in each hand, pulls them so that they unwind and elongate while simultaneously wrapping them around the sides of the body. Upon release, the shape-memory material causes the coil to contract, thus embracing the body and holding the garment between the body and the uncoiled band. The garment can have one or more coiled bands, such as at the waist, chest, or neck, to secure the garment closely to the body quickly and without assistance.

26 Claims, 3 Drawing Sheets

U.S. PATENT DOCUMENTS

| | | | | |
|---|---|---|---|---|
| 3,921,221 A | * | 11/1975 | Zoephel | 2/51 |
| 3,935,596 A | | 2/1976 | Allen, Jr. et al. | |
| 4,395,782 A | | 8/1983 | Reynolds | |
| 4,674,132 A | * | 6/1987 | Stein et al. | 2/114 |
| 4,724,548 A | * | 2/1988 | London | 2/338 |
| 5,953,753 A | * | 9/1999 | Perez | 2/50 |
| 6,138,278 A | | 10/2000 | Taylor et al. | |
| 6,241,750 B1 | | 6/2001 | Moultrie | |
| 6,655,558 B2 | * | 12/2003 | Lawrence | 223/14 |
| 6,851,125 B2 | | 2/2005 | Fujikawa et al. | |
| 6,859,938 B1 | | 3/2005 | Niski et al. | |
| 7,093,304 B2 | | 8/2006 | Griesbach, III | |
| 7,383,588 B2 | * | 6/2008 | Victor | 2/16 |
| D572,626 S | * | 7/2008 | Merriam-Smith | D11/200 |
| 2005/0044608 A1 | | 3/2005 | Ambrose et al. | |
| 2006/0117452 A1 | * | 6/2006 | Ambrose | 2/51 |
| 2007/0214539 A1 | * | 9/2007 | Sokoloff | 2/52 |
| 2010/0024094 A1 | * | 2/2010 | Halseth | 2/132 |

FOREIGN PATENT DOCUMENTS

| | | |
|---|---|---|
| JP | 2003-143595 | 7/2008 |
| WO | WO 2005-023030 | 3/2005 |

OTHER PUBLICATIONS http://www.koalagown.com Jun. 10, 2009, pp. 1-7.

* cited by examiner

SELF-SECURING GARMENT

BACKGROUND OF INVENTION

The use of medical gowns, sterile coverings, and other similar clothing in medical or clinical settings is a familiar sight in hospitals, clinics, and doctor's offices. The function of such clothing is to prevent the transmission of fluids, microorganisms, chemicals, and other products from patients to medical personnel, and vice versa. For the purpose of maintaining sterility, such garments are usually preferred to have a continuous front portion with the closures appealing somewhere on the back of the garment, commonly at the neck and about the waist.

The traditional means for closing such garments is with ties that are usually fastened at the back of garment. Some medical garments have ties that are sufficiently long enough to be wound around the body and fastened or tied at the front. Other closure means used with disposable surgical gowns include buttons, hooks, tape, hook and loop belts, etc. However, these and other common closure methods take time and/or physical effort by the wearer to secure. In some instances, they can require assistance in closing the back of the gown because the wearer cannot reach the closure or to do so would contaminate sterile hands. Under extreme medical emergencies, medical personal have been known to simply insert their arms into the gown and pull it up over the shoulders to save time. However, the gown is not secured and often falls down hindering movement and sight of the patient, or worse, exposing the wearer or patient to contamination.

There have been attempts to provide self-closing garments. For example, U.S. Pat. No. 2,675,551 discloses an elastic plastic hoop that encircles the waist and supports a garment. The hoop is designed to be an oval form with slightly overlapping ends. The hoop embraces the body and the material, with time and the effect of body heat, will relax sufficiently to conform to the shape of the wearer. Thus, the hoop is designed for long-term wear and has an initial diameter of between about 17" and 29" and will expand to about 24" to 33" inches.

U.S. Published Application No. 2005/0044608 describes a self-donning medical gown that utilizes one or two curved closure members of a rigid or semi-rigid material. The closure members are operably affixed to and extend laterally across the entire gown body. Pressing or manipulating the closure members at the front of the gown causes the ends of the closure members in the back of the gown to be pushed together forcing the opening in the back of the gown to close. Various types of capturing techniques can be used to keep the gown closed once the edges are in contact.

While these devices fulfill their respective objectives, their bulky or elongated configurations can make them difficult to package or store. Some still require a considerable amount of time to secure or only cover a portion of the wearer.

The need for a full-length disposable medical gown that can be quickly donned and secured without assistance is evident. A greater need exists for a disposable medical gown with compact, self-closing structures that can be easily packaged and stored. What is especially required is a garment with self-closing structures that can be quickly and safely placed around the body, particularly around the neck.

BRIEF SUMMARY

It is generally known that disposable medical gowns, sheaths, and other such garments are used to reduce or prevent transmission of biological contaminants or other substances to and from a wearer. To ensure sterility, most designs for such garments have closures in the back. As a result, securing such garments requires time and/or assistance to close the back of the gown. Under dire circumstances, medical personnel may not have the luxury of time to secure the back of the garment or an extra person to assist. Often, they simply pull it up over their shoulders, overlap the back flaps, and get to work. But, eventually, the unsecured gown falls down where it gets in the way of work or can block the person's view of the patient as they are bending over.

In accordance with an embodiment of the subject invention, the problem of a medical garment that is time-consuming and/or difficult to put on is solved by a self-securing garment designed to be donned quickly and safely secured in a matter of seconds. The subject application describes a garment with a back-opening gown body terminating at two opposite edges at the back of the garment. Attached to the outside of the garment is at least one elongated band of shape-memory material having ends that are formed into flexible coils. To use, the wearer puts on the garment as usual and, grasping a flexible coil in each hand, pulls them so that they unwind while simultaneously wrapping it around the side of the body. Upon release, the shape-memory material causes the coil to contract, thus embracing the body and holding the garment between the body and the uncoiled band. A garment can have one or more coiled bands at various locations, such as at the waist, chest, or neck, to secure the garment to the body quickly and without assistance.

BRIEF DESCRIPTION OF DRAWINGS

In order that a more precise understanding of the above recited invention be obtained, a more particular description of the invention briefly described above will be rendered by reference to specific embodiments thereof that are illustrated in the appended drawings. Understanding that these drawings depict only typical embodiments of the invention and are not therefore to be considered as limiting in scope, the invention will be described and explained with additional specificity and detail through the use of the accompanying drawings in which.

DETAILED DISCLOSURE

Figure 1:
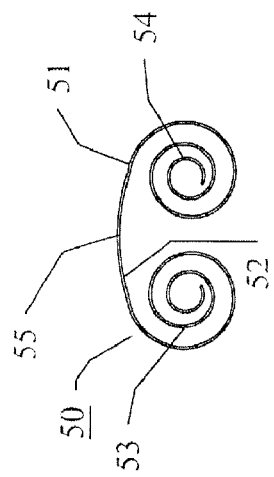
FIG. 1 is an illustration of one embodiment of a flexible band of the subject invention.

The subject invention in general describes embodiments of self-securing garments. More specifically, the subject invention pertains to embodiment(s) of medical gowns, or other garments, capable of being donned and secured around the body quickly and easily without assistance.

The following description will disclose that the subject invention is particularly useful in the field of protective garments and, in particular, garments worn by medical personnel during emergency situations where time and safety can be critical. However, a person with skill in the art will be able to recognize numerous other uses that would be applicable to the devices and methods of the subject invention. While the subject application specifically describes medical or surgical gowns, other types of applicable apparel will be apparent to a person with skill in the art having benefit of the subject disclosure and are contemplated to be within the scope of the present invention.

The terms "surgeon", "physician" or "medical personnel" as used in the subject invention are merely for literary convenience. The terms should not be construed as limiting in any way. The devices, apparatuses, methods, techniques and/or procedures of the subject invention could be utilized with any field of endeavor by any person desiring or needing to do so and having the necessary skill and understanding of the invention.

In addition, references to "first", "second", and the like (e.g., first and second coil), as used herein, and unless otherwise specifically stated, are intended to identify a particular feature of which there are at least two. However, these references are not intended to confer any order in time, structural orientation, or sidedness (e.g., left or right) with respect to a particular feature.

It should also be understood that the term "garment" or "gown" as used in the subject application are merely for literary convenience. The terms should not be construed as limiting in any way. While useful with wearable garments having back-openings, the self-securing device of the subject invention could be used with any of a variety of front-, side-, or back-opening garment styles. This can include such wearable garments as gowns, shirts, dresses, aprons, bibs, vests, pants, chaps, and other leg clothing, and the like, including any combinations or variations thereof. The garments can be formed from a single and/or continuous sheet of material or from a plurality of sheets of material joined or connected together.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

With reference to the attached figures, which show certain embodiments of the subject invention, it can be seen that an embodiment of the subject invention comprises a gown 10 with at least one self-securing device capable of securing the gown to a person. More particularly, the subject application describes a gown having one or more flexible bands 50 capable of extending at least partially around an area of the body and holding the gown against a wearer.

A flexible band of the subject application can comprise any of a variety of materials having at least some shape-memory characteristics, such as, for example, numerous types of plastics, metals, wood or paper products, rubbers, ceramics, woven or non-woven fabrics, or combinations thereof. In one embodiment, the band is made of a material that is light, flexible, and disposable. In a further embodiment, the material has sufficient flexibility to allow the shape of the band to be altered and returned to the same or almost the same initial configuration. Preferably, the material utilized for a band of the subject invention is capable of being disposed of and/or processed in the same manner as a discarded gown. It can also be advantageous for the band to be lightweight and easily unwound, but with sufficient tensile strength and shape memory to secure it around a wearer. In a further embodiment, a band of the subject invention can be brightly colored, fluorescent, and/or reflective, so that it is easy to see at all times.

Figure 2:
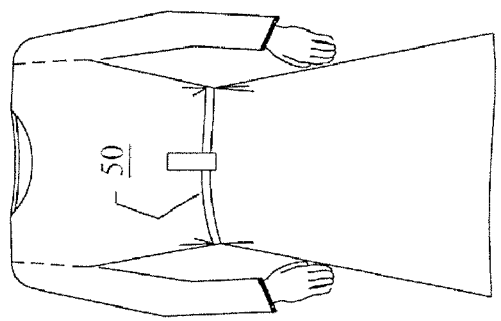
FIG. 2 shows a procedure for using a flexible band of the subject invention.
Figure 2:
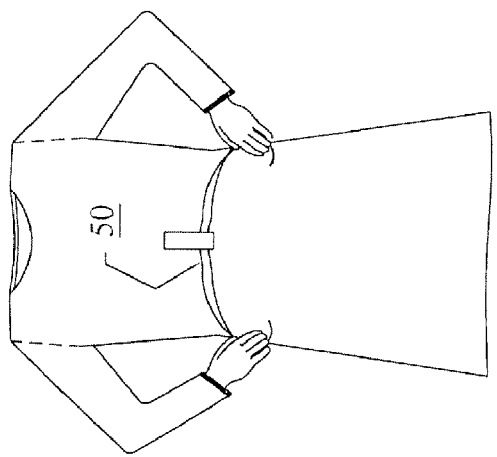
Figure 2:
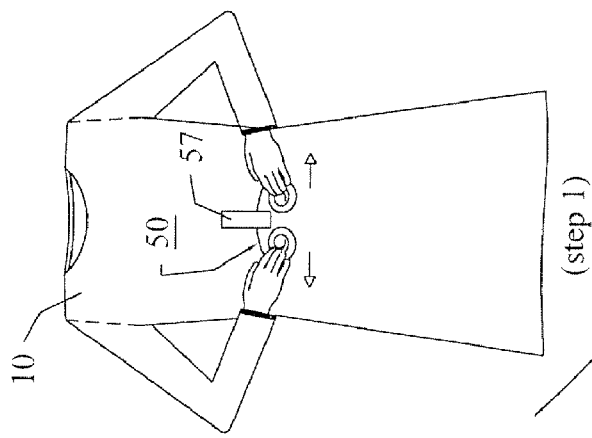

In one embodiment, the band 50 is an elongated at least partially flattened strip of flexible material having an outer side 51 and an inner side 52, a first end 53 and a second end 54 with a defined length there between. In an alternative embodiment, the band 50 is a length of flexible rod- or wire-like material having a substantially circular cross-section. In a further embodiment, the ends of the band are coiled, such as shown, for example, in FIG. 1. In this embodiment, the first end 53 and the second end 54 form oppositely wound substantially flat spiral coils on the inner side 52 of the band, facing each other, such that they are generally mirror-images, for example, as shown in FIGS. 1 and 2. In an alternative embodiment, the first end 53 and second end 54 form oppositely wound substantially flat spiral coils on opposite sides of the band, such that the first end 53 is coiled towards the outer side 51 of the band and the second end 54 is coiled towards the inner side 52.

At least one self-securing band can be affixed at an area between the coiled ends to the outside of the gown, usually at or near the front of the gown. The area between the coiled ends can be straight or curved, but is generally the approximately central point 55 from which the two coiled ends extend. In a specific embodiment, the approximately central point between the coiled ends is at about the longitudinal center of the band and is the point at which the band can be attached to the outside front of the gown. In alternative embodiments, the band can be offset to one or the other side of the gown. To secure the gown around a person, the band can be grasped at or near either side of the approximately central point 55 of the band (step 1, FIG. 2) and the hands moved in opposite directions, usually simultaneously, causing the coil ends to unwind (step 2, FIG. 2). When sufficiently unwound, the first end 53 and the second end 54 can be moved towards the back of the body and released (step 3, FIG. 2). The shape-memory material of the flexible band 50 will cause them to try to resume their original coiled configuration, forcing them to press against the body with the gown held there between.

In a further embodiment, a band 50 of the subject invention has a covering of a material, coating, or substance. In a further embodiment, the covering aids in the placement and holding of the band around the wearer. In a still further embodiment, the material is a highly visibly discernable color. In a particular embodiment, the covering is a sleeve of material. Still more particularly, the material can be similar or identical to that of the garment.

To secure a band to a garment, any of a variety of techniques can be utilized with the subject invention. Preferably, the attachment method permits the coiled ends to lie against the gown when not in use, for example, as shown in step 1 of FIG. 2. In one embodiment, a waist loop 57, similar to a belt loop, is affixed to the gown to secure all or some portion of the approximately central point 55 of the band 50 to the gown. In a further embodiment, the waist loop 57 can be elongated and used to affix the approximately central point 55 of the band 50 to the gown, as shown, for example, in FIG. 2. Use of an elongated waist loop 57 allows the position of the band to be adjusted to the waist of the wearer without having to move the gown up or down. This can reduce or eliminate bunching and gathering of the gown material above the waist for some individuals or stretching and pulling of the gown for others.

Alternative embodiments can employ stitching, one or more adhesives or similar material, hook and loop tape, snaps, ties, various types of hemming, sleeving, or casing, or combinations thereof for retaining the approximately central point of the band. A person with skill in the art would be able to determine any of a variety of techniques and devices for attaching a flexible band of the subject invention to a gown. Such variations are contemplated to be within the scope of the subject application.

In yet a further embodiment, a band 50 of the subject application can use a material for a portion of the approximately central point 55 that is different than that of the coiled ends. This different material at the approximately central point 55 of the band can be one that is capable of being fixedly attached directly to the garment, such as by heat-sealing, cold-sealing and/or crimp-sealing to a gown. In a further embodiment, any of a variety of high-pressure indentation or embossing techniques could be used, as known to those with skill in the art. In this embodiment, all or some portion of the approximately central point material can be attached to the gown by applying high pressure to form indentations or embossing that join or intertwine the fibers and/or materials of a gown and band. In a further embodiment, such high-pressure embossing or indentation techniques can be used in conjunction with an adhesive. A person with skill in the art and benefit of the subject disclosure would be able to determine any of various methods and devices that could be used to cold-seal, crimp-seal, or pressure-seal material to a gown of the subject invention, and such variations are contemplated to be within the scope of the subject invention.

Figure 3:
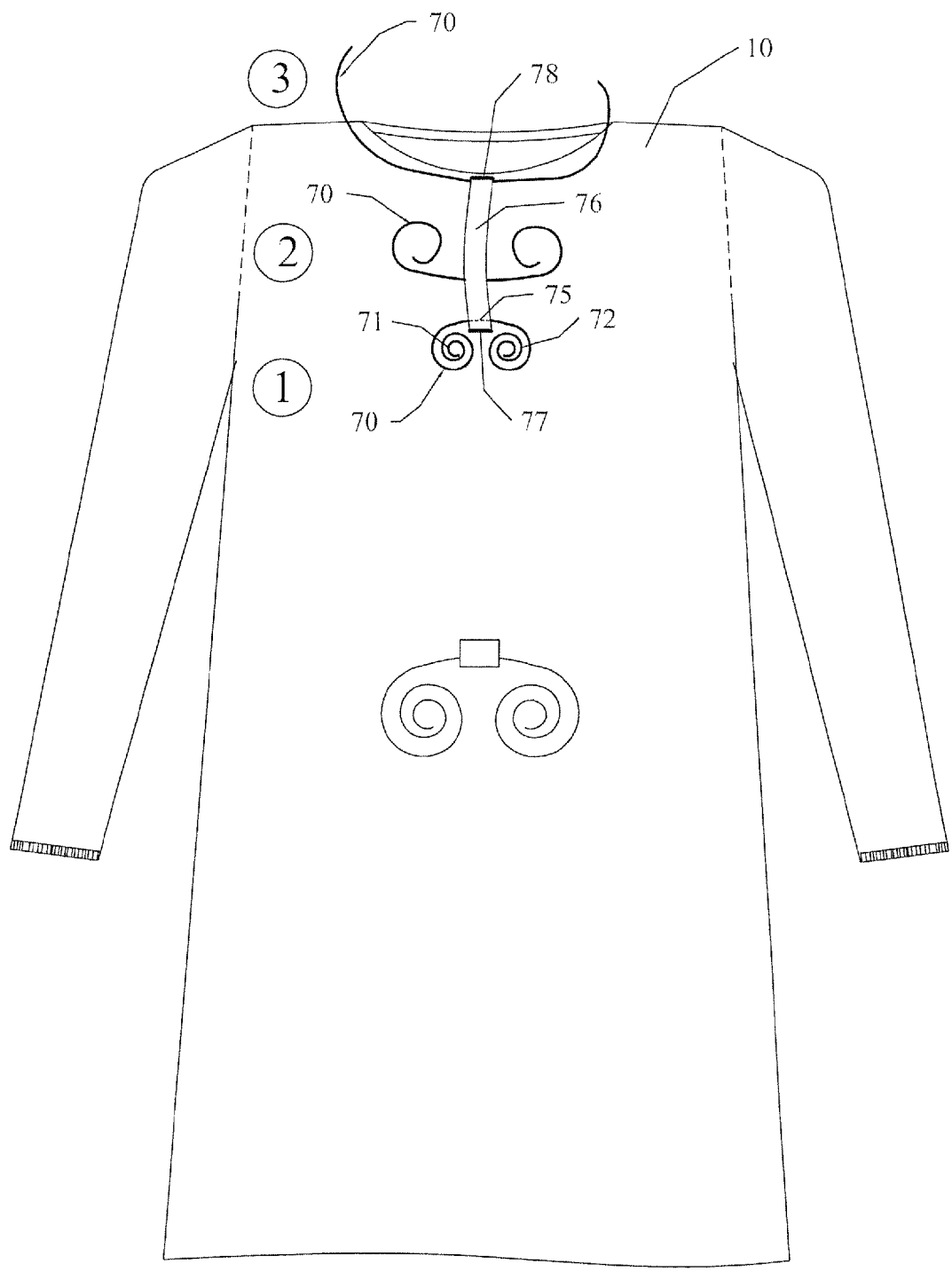
FIG. 3 is an illustration of a gown having flexible bands of the subject invention attached for use at the waist and at the neck.

As mentioned above, a gown of the subject invention can have one band positioned on the outside at or near the waist area. In a further embodiment, a gown of the subject invention can make use of more than one flexible band or bands in different locations to secure it to a person. In one embodiment, a self-securing band can be positioned on the front of the gown at or near the neck for securing the upper part of the gown around a person's neck. A self-securing neck band 70 and a flexible band 50 can be the same or have different dimensions or materials to accommodate different locations and uses. In one embodiment, an example of which is shown in FIG. 3, the overall dimensions of the neck band 70 are smaller than a band 50 that spans the waist. In this embodiment, the length of a neck band can be shorter than that of a flexible band 50 that goes around the waist. In a further embodiment, the width of a neck band 70 can also be narrower for a more comfortable fit around the neck.

A neck band 70 can be affixed to the gown at or near the neck in the same or similar fashion as described above for a flexible band 50, and utilized in the same fashion. That is, some portion of the approximately central point 75 of the neck band can be affixed to the gown. FIG. 3 illustrates an example of how to use the neck band 70, where the first coiled end 71 and the second coiled end 72 are unwound and placed around the neck. The shape-memory material of the neck band 70 causes the band to try to resume the original coiled configuration, which results in the band encircling the neck. The attachment of the neck band to the gown can allow the gown to be pulled upwards and held against the body when the neck band 70 is placed around a person's neck.

In many situations, a physician or surgeon must move quickly to assist patients. It can be seen that a gown of the subject invention can be donned and secured in a matter of seconds. Therefore, it is important that when moving quickly, and donning a gown of the subject invention, medical personnel do not injure themselves while unwinding a flexible band near the neck or face. It such situations, it can be helpful to have a neck band 70 of the subject invention located a sufficient distance from the face. This can ensure that it is firmly grasped and unwound away from the face and eyes prior to coming near the face and being placed around the neck.

In one embodiment, a neck band 70 can be affixed to the gown utilizing a lanyard or other elongated device that locates the neck band 70 away from the face before placing around the neck. In another embodiment, a neck band 70 can be attached to a gown utilizing an elongated neck loop 76, illustrated in a non-limiting example in FIG. 3. In this embodiment, the neck band is located at the bottom end 77 of the neck loop 76 when not in use (step 1, FIG. 3). When the neck band is to be used to secure the gown, it can be unwound a safe distance from the face (step 2, FIG. 3). Once unwound, it can be moved to the top end 78 of the neck loop and the uncoiled ends placed around the neck, so that when released there is little or no chance of them contacting the face or eyes of the wearer as they retract (step 3, FIG. 3).

The dimensions of a self-securing band of the subject invention can vary depending upon several factors, including the material utilized for the band, the location on the gown, the tightness of the coiled ends, method of attachment to the gown, as well as other factors known to those with skill in the art. One factor that can be considered is how well a gown, in particular the back opening of a gown, must be secured to and around the wearer. In many situations, it is important or necessary for a gown to be secured entirely around a person, such that the back opening is closed. In some hospital or clinic environments, a gown must be fully closed in the back to be considered properly sterile. This means that a gown of the subject invention employed in such situations necessarily must have one or more bands of sufficient length to encircle the body of a variety of different size wearers to ensure closure of the back opening. Thus, the length of a band for use around the waist of a wearer can be relatively long to accommodate a variety of sizes of people. Similarly, the width of a band for use with a gown as described herein can vary depending upon the expected size of a person and where it will be located on the gown. For example, a band intended to be used around the neck might be narrower than one intended for use around the waist. Alternatively, different size gowns with at least one appropriate size band attached can be provided, allowing a wearer to choose the appropriate size. A person with skill in the art would be able to determine a variety of flexible band widths and lengths that would be appropriate for the various uses of the gowns of the subject invention. Substitution of sizes or dimensions other than those specifically exemplified herein is contemplated to be within the scope of the present invention.

Once affixed to a gown, it can be further desirable for a flexible band 50 of the subject invention to be secured to or against a gown or restrained to reduce or prevent movement, such as twisting, turning, or sliding up and down a tab, as described above, until needed to secure the gown. Any of a variety of methods known to a person with skill in the art can be used to hold or affix the bands and/or the coiled ends to the gown prior to use. In one embodiment, a band engaged with a restraining device is utilized in the same fashion, except that it is disengaged from the restraining device prior to unwinding the coils. In a preferred embodiment, a restraining device permits a band to be disengaged quickly or simultaneously with the unwinding of the coils.

In one embodiment, any of a variety of adhesives can be used to removably attach the bands to the outside of the garment, so that they lie against the gown. In another embodiment, one side of the coiled ends of a band can be removably heat sealed to the gown.

Figure 4B:
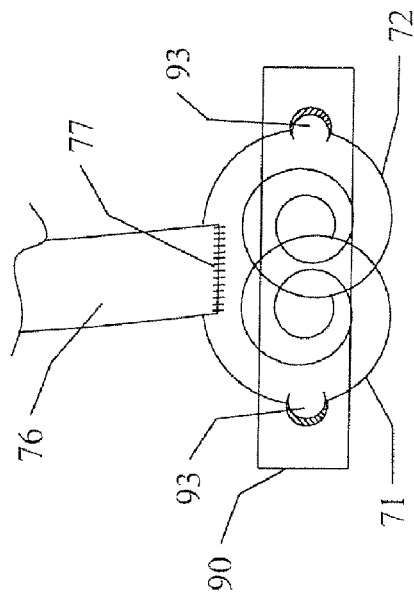
FIG. 4B illustrates an enlarged view of the neck band shown in FIG. 4A.
Figure 4A:
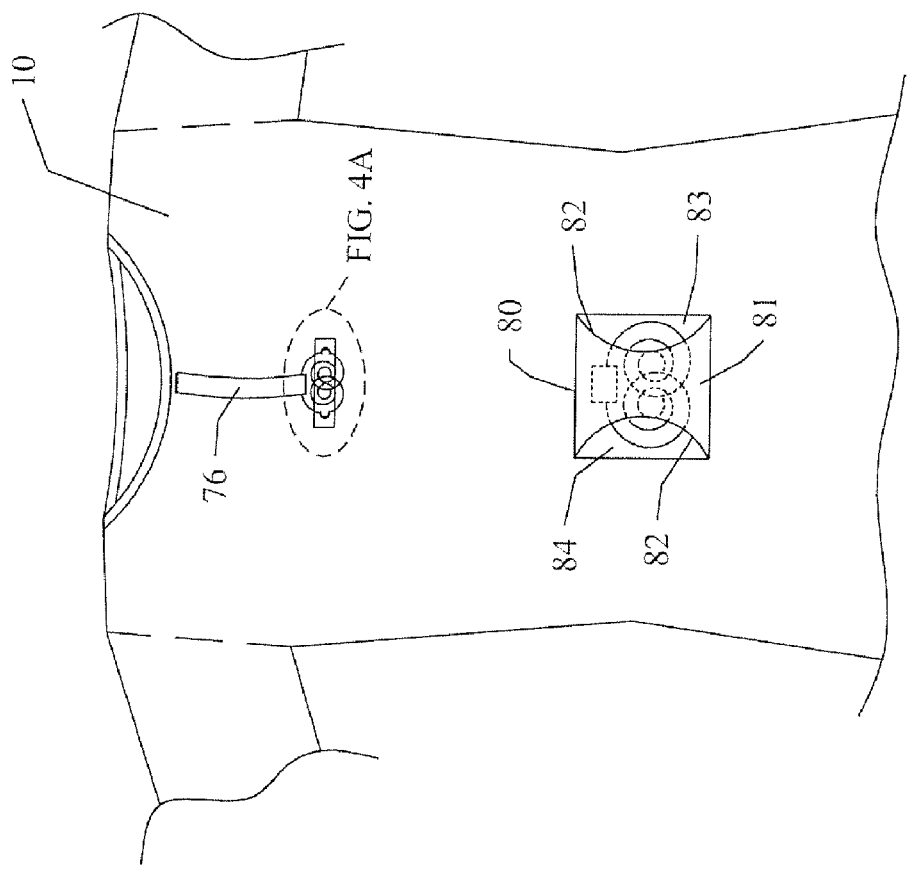
FIG. 4A illustrates one embodiment of a garment having a flexible band at the waist being restrained by a sleeve and a neck band being restrained against the garment with a tabbed card.

Other methods for securing or stabilizing bands of the subject invention utilize various guards, bands, seals, covers, sleeves, or similar devices for holding, stabilizing, containing, or otherwise temporarily restraining the bands of the subject invention. In one embodiment, a pouch 80 having a front overlay 81 and a back panel 83 and openings on opposite sides can be used to contain a band and secure it against the garment. One or more pouches can be used in any location on a garment to secure one or more different types of bands of the subject invention. Thus, a pouch can be used to secure a band for the waist or a band for the neck. FIG. 4A illustrates one embodiment of a flexible band for use around the waist that is contained within a pouch 80 having openings 84 on either side for access to the band. In this embodiment, the band is secured against the back panel 83 inside the pouch, as seen in FIG. 4. In an alternative embodiment, a pouch is formed by an overlay fixedly attached to the gown, such that the back panel is provided by the outside of the gown. In a further embodiment, the side openings 84 have indentations 82 that partially expose the band to facilitate grasping. This can be particularly helpful to someone who may be wearing gloves. In a still further embodiment, the band is wound so that the coils are closer or overlapping to permit use of a smaller or more compact pouch. A pouch or front overlay can be attached to a gown by any of various methods and devices described herein or by other methods or devices known to those with skill in the art and such variations are considered to be within the scope of the subject invention.

In another embodiment, a tabbed card 90 can be used to hold a band of the subject invention against a gown when not in use. In one embodiment, a tabbed card 90 is generally a stiff or sufficiently firm material having two or more tabs capable of engaging with one or more coils of a band. One or more tabbed cards can be used in any location on a garment to secure one or more different types of bands of the subject invention. Thus, a tabbed card can be used to secure a band for the waist or a band for the neck In a specific embodiment, a tabbed card 90 is a piece of stiff material, such as, for example, cardboard or paperboard, having two tabs 93 that open to opposite sides of the card. In this embodiment, a band can be positioned on the tabbed card with at least one of the coils on the first end 71 engaged with one tab 93 and at least one of the coils on the second end 72 engaged with the opposite tab 93. FIG. 4B illustrates an embodiment of a tabbed card 90 used to hold a neck band 70. In a further embodiment, the coiled ends of the band can be wound so that they are closer to each other or so that they overlap to decrease the overall size of the band and, thus, the size of the tabbed card required to restrain the band. FIGS. 4A and 4B illustrate an embodiment having a neck band wound so that the coiled ends overlap and engage with a tabbed card. In a further embodiment, the tabbed card is affixed to the gown so that the band is held a sufficient distance from the face, such as, for example, at the bottom end 77 of a neck loop 76. In a one embodiment, the tabbed card 90 can be positioned on the gown so that the coiled ends are held downwards, as shown, for example, in FIG. 4B. In an alternative embodiment, a tabbed card can be positioned so that the coiled ends are held facing upwards eliminating the need to turn them towards the neck prior to unwinding them.

The self-securing gowns described by the above application are quickly and easily put on by a person. Certain gown embodiments detailed herein require only a few seconds for a single person to insert their arms, drape around the body, secure it against the body, and close it at the back and at the neck. This can ensure that doctors, physicians, other medical personnel, or anyone in need of protection can be properly covered and safely secured to protect themselves and other people.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

It should be understood that any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is submitted that it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures, can be effected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

I claim:

1. A garment capable of covering some portion of a wearer, said garment having attached thereto at least one elongated band comprising: a first end and a second end, wherein the first and second ends are two flat coils that are wound towards each other, so that a substantial defined length of the elongated band is part of one or both coils;
an outer side and an inner side; and
a means for attaching the band to the garment;
where at least a portion of said band comprises a flexible shape-memory material.

2. The garment, according to claim 1, wherein the elongated band is a length of rod- or wire-like material.

3. The garment, according to claim 1, wherein the at least one elongated band is a waist band.

4. The garment, according to claim 3, wherein said means for attachment is a waist loop for movably attaching the waist band to the garment.

5. The garment, according to claim 4, wherein the waist loop is sufficiently elongated to permit adjustable placement of the waist band.

6. The garment, according to claim 1, wherein the at least one elongated band is a neck band.

7. The garment, according to claim 6, wherein the first end and the second end are located on the same side of the at least one elongated band.

8. The garment, according to claim 6, further comprising a neck loop for moveably attaching the neck band to the garment.

9. The garment, according to claim 8, wherein the neck loop is sufficiently elongated to permit the neck band to be unwound at an appropriately safe distance from the face of a wearer prior to placement.

10. The garment, according to claim 1, further comprising a pouch having two side openings and affixed to the garment for restraining the at least one elongated band against the garment prior to use.

11. The garment, according to claim 10, wherein the pouch comprises a front overlay affixed to the garment.

12. The garment, according to claim 11, further comprising indentations along the edge of the side openings.

13. The garment, according to claim 12, further comprising a back panel to which is attached the front overlay, wherein the back panel is attached to the gown.

14. The garment, according to claim 1, further comprising a tabbed card for securing the at least one elongated band to the garment.

15. The garment, according to claim 14, wherein the tabbed card comprises at least two tabs for securing the first coiled end and the second end.

16. The garment, according to claim 1, further comprising disposable materials.

17. The garment, according to claim 1, wherein the elongated band is an at least partially flattened strip of material.

18. The garment, according to claim 1, wherein at least a portion of the elongated band comprises a reflective, fluorescent, or brightly colored material.

19. The garment, according to claim 1, wherein the first and second coiled ends are two oppositely wound, substantially flat coils on the same side of the band.

20. The garment, according to claim 1, wherein some portion of the material of the elongated band, between the first and second coiled ends, is a means for attachment of the elongated band to the garment.

21. The garment, according to claim 20, wherein some portion of the material of the elongated hand is affixed to the garment utilizing a heat-sealing or a crimp-sealing technique.

22. The garment, according to claim 21, wherein the material by which the elongated band is affixed to the garment is different than that of the elongated band.

23. The garment, according to claim 1, wherein the first and second ends are wound in the same direction on opposite sides of the band.

24. The garment, according to claim 3, wherein the waist band is affixed at about the center of the front waist area of the garment.

25. The garment, according to claim 3, wherein the waist band is affixed at a point offset from the center of the front waist area of the garment.

26. The garment, according to claim 3, wherein the waist band can be uncoiled and placed around the waist of the wearer to secure the garment around the wearer.

* * * * *